US011212567B2

(12) United States Patent
Eyer

(10) Patent No.: US 11,212,567 B2
(45) Date of Patent: *Dec. 28, 2021

(54) QR CODES FOR GUIDED SERVICE AUTHORIZATION

(71) Applicant: SONY CORPORATION, Tokyo (JP)

(72) Inventor: Mark Eyer, Woodinville, WA (US)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,121

(22) Filed: Jun. 3, 2020

(65) Prior Publication Data
US 2020/0296440 A1 Sep. 17, 2020

Related U.S. Application Data

(63) Continuation of application No. 15/826,337, filed on Nov. 29, 2017, now Pat. No. 10,708,641.

(51) Int. Cl.
*H04N 21/254* (2011.01)
*G06K 7/14* (2006.01)
(Continued)

(52) U.S. Cl.
CPC ....... *H04N 21/2541* (2013.01); *G06K 7/1417* (2013.01); *G06K 19/06037* (2013.01);
(Continued)

(58) Field of Classification Search
CPC ............. H04N 21/2541; H04N 21/266; H04N 21/4784; H04N 21/835; H04N 21/2347;
(Continued)

(56) References Cited

U.S. PATENT DOCUMENTS

2003/0070174 A1 4/2003 Solomon
2009/0031373 A1 1/2009 Hogyoku
(Continued)

FOREIGN PATENT DOCUMENTS

EP 2 252 054 A1 11/2010
WO WO 2017/198255 A1 11/2017

OTHER PUBLICATIONS

International Search Report and Written Opinion dated Feb. 7, 2019 in PCT/US2018/062710.
(Continued)

*Primary Examiner* — Nnenna N Ekpo
(74) *Attorney, Agent, or Firm* — Oblon, McClelland, Maier & Neustadt, L.L.P.

(57) ABSTRACT

A reception apparatus includes receiver and processing circuitry. The receiver circuitry receives a broadcast stream that includes a television service selected by a user. The processing circuitry receives a user selection of the television service included in the broadcast stream and determines whether the selected television service is a digital rights management (DRM) protected service. When the selected television service is determined to be the DRM protected service, the processing circuitry outputs a quick response (QR) code for display, monitors the received broadcast stream for a DRM license that is associated with the unique identifier of the reception apparatus, acquires the DRM license that is associated with the unique identifier of the reception apparatus from the received broadcast stream, and decrypts at least one media component of the selected television service using the acquired DRM license.

20 Claims, 10 Drawing Sheets

For access to this Service visit
https://wxbc.com/drm
Your device ID is 0214-a677-09

Or, use your Internet-connected phone or tablet to scan this QR code:

20

(51) Int. Cl.
*H04N 21/266* (2011.01)
*G06K 19/06* (2006.01)
*H04N 21/4784* (2011.01)
*H04N 21/835* (2011.01)

(52) U.S. Cl.
CPC ....... *H04N 21/266* (2013.01); *H04N 21/4784* (2013.01); *H04N 21/835* (2013.01)

(58) Field of Classification Search
CPC ............. H04N 21/25; H04N 21/25816; H04N 21/25875; H04N 21/4405; H04N 21/4627; H04N 21/6334; H04N 21/8586; G06K 7/1417; G06K 19/06037; G06F 21/10; H04L 29/06986; H04L 41/28
See application file for complete search history.

(56) References Cited

U.S. PATENT DOCUMENTS

| | | | |
|---|---|---|---|
| 2009/0304115 A1* | 12/2009 | Pittaway | H04N 21/6112 375/340 |
| 2010/0061549 A1 | 3/2010 | Seo et al. | |
| 2011/0131619 A1 | 6/2011 | Hasek et al. | |
| 2012/0138671 A1* | 6/2012 | Gaede | G06F 16/9554 235/375 |
| 2013/0246584 A1 | 9/2013 | Barton et al. | |
| 2014/0007211 A1* | 1/2014 | Yang | H04L 63/08 726/7 |
| 2014/0351834 A1 | 11/2014 | Srivastav et al. | |
| 2015/0215424 A1 | 7/2015 | Chun et al. | |
| 2015/0230004 A1 | 8/2015 | Vanduyn et al. | |
| 2017/0127154 A1* | 5/2017 | Thattamangalam Narayanan | H04N 21/21805 |
| 2017/0142460 A1 | 5/2017 | Yang et al. | |
| 2017/0228525 A1 | 8/2017 | Wajs et al. | |

OTHER PUBLICATIONS

European Telecommunications Standards Institute, "Digital Video Broadcasting (DVB); Frame structure channel coding And modulation for a second generation digital terrestrial television broadcasting system (DV8-T2)," EN 302 756 V1.4.1, Jul. 1, 2015, 188 pp.

Advanced Television Systems Committee, Inc., "ATSC Standard: ATSC 3.0 System (A/300)," Doc. A/300;2017, Oct. 19, 2017, 56 pp.

Advanced Television Systems Committee, Inc., "ATSC Standard: A/321, System Discovery and Signaling," Doc, A/321:2016, Mar. 23, 2016, 28 pp.

Advanced Television Systems Committee, Inc., "ATSC Standard: Physical Layer Protocol (A/322)," Doc. A/322:2017, Jun. 8, 2017, 262 pp.

Advanced Television Systems Committee, Inc., "ATSC Proposed Standard: Signaling, Delivery, Synchronization, and Error Protection (A/331)," Doc. S33-331r1, Nov. 7, 2017, 206 pp.

Advanced Television Systems Committee, Inc., "ATSC Proposed Standard; ATSC 3.0 Interactive Content (A/344)," S34-230r5, Nov. 15, 2017, 134 pp.

* cited by examiner

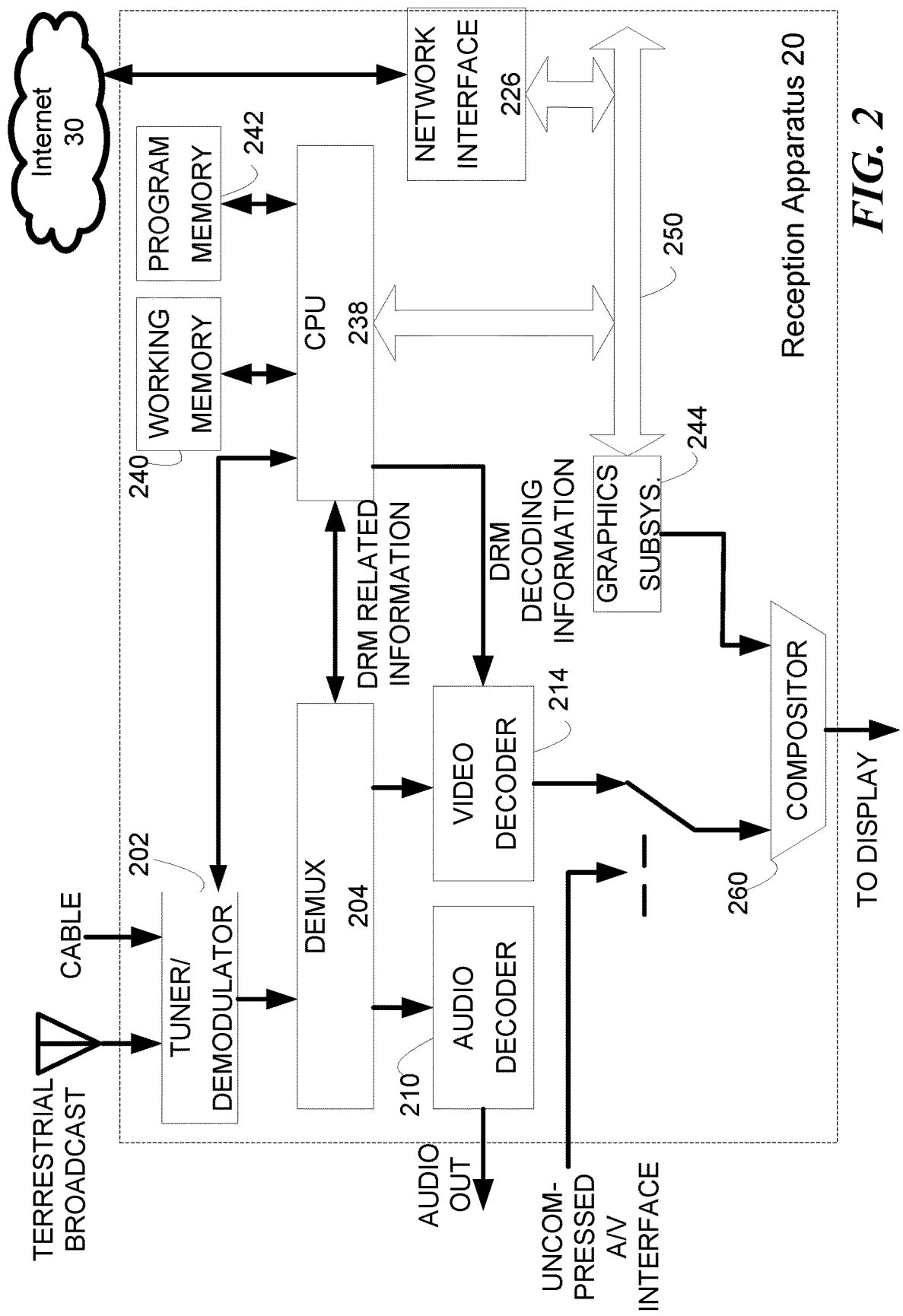

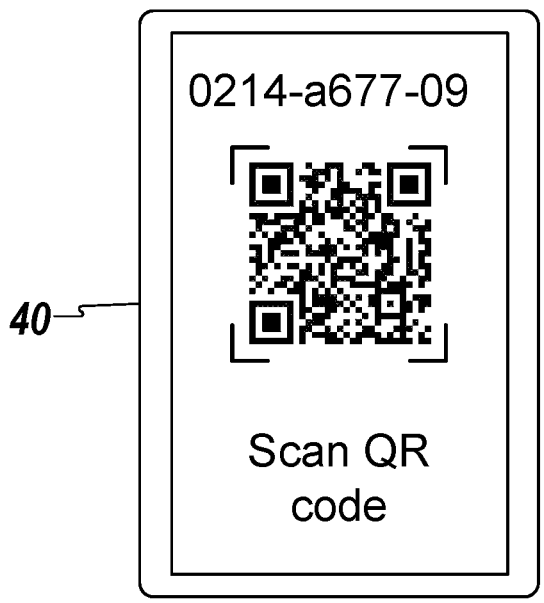
FIG. 5 http://wxbc.com/drm?ua=0124a67709&sid=5772

WXBC Premium Sports Subscription

First Name

Last Name

E-mail

Device ID

0124a67709

Payment Information

Card Number

Expiration Date

Security Code

Submit

QR CODES FOR GUIDED SERVICE AUTHORIZATION

CROSS-REFERENCE TO RELATED APPLICATIONS

This application is a continuation of U.S. patent application Ser. No. 15/826,337, filed on Nov. 29, 2017, the entire contents of which is incorporated herein by reference.

TECHNICAL FIELD

The present disclosure relates to providing access to protected content.

BACKGROUND

Television broadcasting has evolved from basic analog terrestrial broadcast television to complex digital broadcast television systems. Broadcasting standards currently under development are expected to allow broadcasters to provide protected as well as unprotected content. A television that receives the protected content needs to first obtain a license in order to access the protected content.

The foregoing "Background" description is for the purpose of generally present the context of the disclosure. Work of the inventor, to the extent it is described in this background section, as well as aspects of the description which may not otherwise qualify as prior art at the time of are neither expressly or impliedly admitted as prior art against the present invention.

SUMMARY

According to an embodiment of the present disclosure, there is provided a reception apparatus, including receiver circuitry and processing circuitry. The receiver circuitry is configured to receive a broadcast stream that includes a television service selected by a user. The processing circuitry is configured to receive a user selection of the television service included in the broadcast stream, and determine whether the selected television service is a digital rights management (DRM) protected service. The processing circuitry is configured to, when the selected television service is determined to be the DRM protected service, output a quick response (QR) code for display, monitor the received broadcast stream for a DRM license that is associated with a unique identifier of the reception apparatus, acquire the DRM license that is associated with the unique identifier of the reception apparatus from the received broadcast stream, and decrypt at least one media component of the selected television service using the acquired DRM license. The QR code contains a uniform resource locator (URL) that includes an address of a website for subscribing to the selected television service and the unique identifier of the reception apparatus.

According to an embodiment of the present disclosure, there is provided a non-transitory computer-readable medium storing instructions which when executed by a computer cause the computer to perform a method of accessing a DRM protected service. The method includes receiving a user selection of a television service included in the broadcast stream, receiving a broadcast stream that includes the television service selected by a user, and determining whether the selected television service is the DRM protected service. When the selected television service is determined to be the DRM protected service, a QR code is output for display, the received broadcast stream is monitored for a DRM license that is associated with a unique identifier of the reception apparatus, the DRM license that is associated with the unique identifier of the reception apparatus is acquired from the received broadcast stream, and at least one media component of the selected television service is decrypted using the acquired DRM license. The QR code contains a URL that includes an address of a website for subscribing to the selected television service and the unique identifier of the reception apparatus.

According to an embodiment of the present disclosure, there is provided a method of a reception apparatus for accessing a DRM protected service. The method includes receiving a user selection of a television service included in the broadcast stream, receiving by receiver circuitry of the reception apparatus a broadcast stream that includes the television service selected by a user, and determining whether the selected television service is the DRM protected service. When the selected television service is determined to be the DRM protected service, a QR code is output by processing circuitry of reception apparatus for display, the received broadcast stream is monitored by the processing circuitry for a DRM license that is associated with a unique identifier of the reception apparatus, the DRM license that is associated with the unique identifier of the reception apparatus is acquired by the processing circuitry from the received broadcast stream, and at least one media component of the selected television service is decrypted using the acquired DRM license. The QR code contains a URL that includes an address of a website for subscribing to the selected television service and the unique identifier of the reception apparatus.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 illustrates an exemplary reception apparatus;

FIG. 5 illustrates an example of an Internet-connected device that scans a QR code;

FIGS. 6A, 6B illustrate exemplary web pages for subscribing to a DRM protected service;

DETAILED DESCRIPTION

Figure 1:
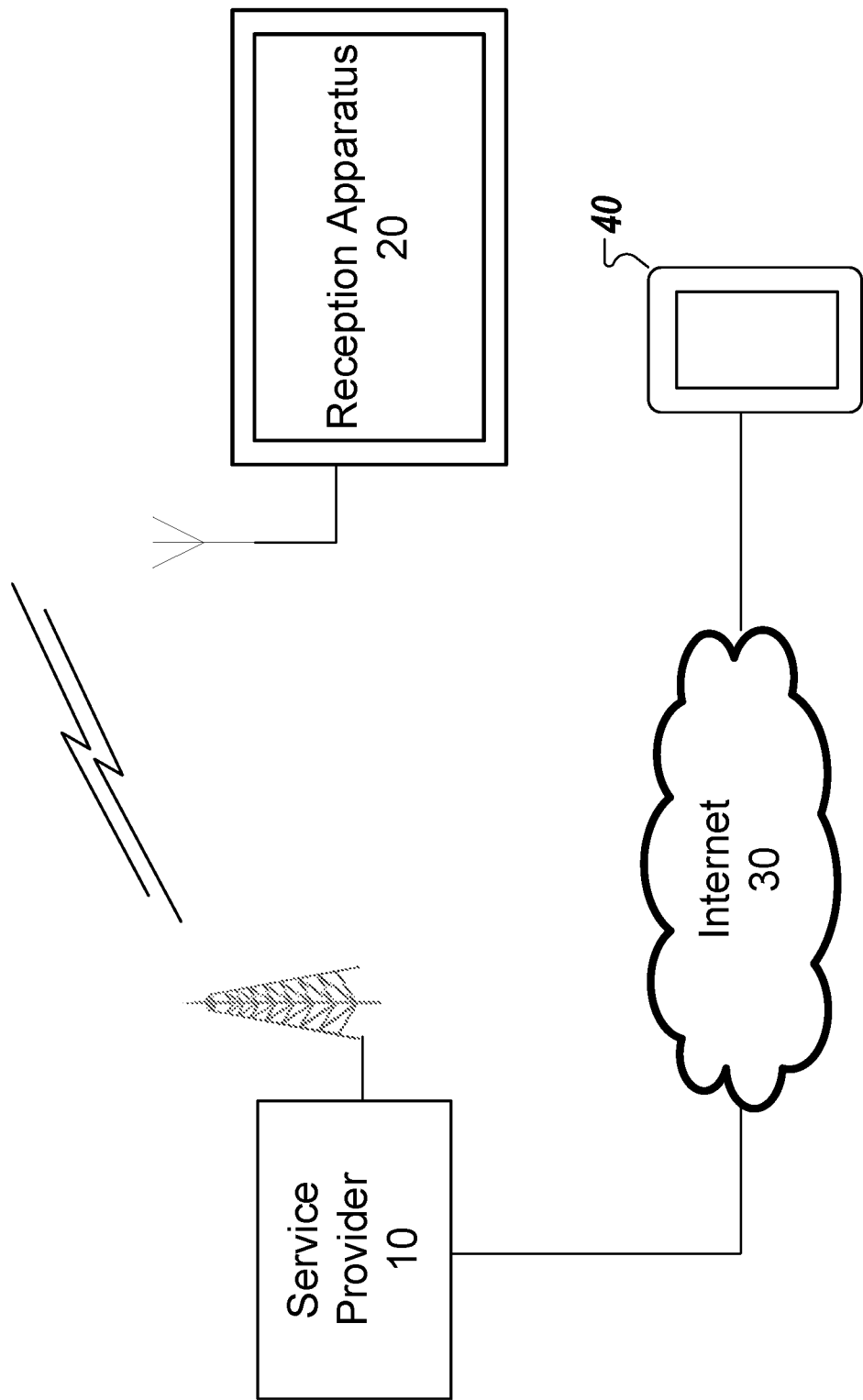
FIG. 1 illustrates an exemplary digital television broadcast system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described.

Referring now to the drawings, wherein like reference numerals designate identical or corresponding pans throughout several views, the following description relates to providing access to protected content.

Broadcasters of television content have expressed interest in delivering protected content, such as content protected with a Digital Rights Management (DRM) system. In an embodiment of the present disclosure, the DRM protected content would be available for viewing only to authorized users whose reception apparatuses support one of the DRM systems used to encrypt the content and have obtained a license to access the encrypted content. The license can grant access on an individual content basis, individual service basis, or broadcaster basis. A user may be granted the license by paying for the right to access the DRM protected content or service(s), or by satisfying some other criterion established by the broadcaster or content owner.

The DRM protected content can be provided in non-real-time individually or as part of a non-real-time or real-time service. Some content are linear real-time broadcast programming, while others may be "application based," meaning that a user's experience when tuning to that content is determined as a reception apparatus executes a broadcaster-defined defined downloaded HTML 5 application for example. The service can be either continuous or intermittent and includes a collection of media components and/or metadata that is delivered to a reception apparatus in aggregate. Further, each service can be associated with a user selectable channel number (e.g., 4.6) of the broadcaster. A real-time service can include a sequence of television programs. In one embodiment, the service is an Advanced Television Systems Committee (ATSC) 3.0 Service, as defined in ATSC Standard A/300-ATSC 3.0 System (Doc. A/300:2017 dated Oct. 19, 2017), which is incorporated by reference in its entirety.

While a reception apparatus connected to the Internet could allow a user to directly interact with the broadcaster's service center to gain access to DRM protected content, some reception devices are "unconnected devices," which for example do not have Internet access and receive signals only from a broadcast antenna source. An unconnected reception apparatus may present a user with instructions on how to subscribe to the DRM protected content or service.

In one embodiment, the unconnected reception apparatus presents the user with a user interface indicating a telephone number to call and specific information the agent will need. The user would be expected to, for example, pick up a telephone to call a broadcaster's service center to interact with an agent and provide a device identifier (device ID) of the reception apparatus and satisfy payment and/or other subscription requirements. The reception apparatus could further, or alternatively, present the user with an Internet URL that he or she could use to access a website using an Internet-connected device. For example, the user would be expected to enter the displayed URL into a web browser of the Internet-connected device, and then interact with a website associated with the broadcaster to provide the device ID of the reception apparatus and satisfy the payment and/or the other subscription requirements.

Requiring the user to call a service center or manually type in a URL can be awkward and user-unfriendly because it involves either a telephone call with a rather complex transaction, and/or certain information to be correctly and accurately conveyed (e.g., recorded from the screen and related to the agent, or manually entered into the Internet-connected device). Accordingly, certain embodiments of the present disclosure provide a simpler, cleaner, and more straightforward user interface to allow an unconnected reception apparatus to access DRM protected content using a Quick Response (QR) code.

FIG. 1 is an exemplary digital television broadcast system for providing access to one or more protected content (e.g., DRM protected content). The system includes a service provider 10, a reception apparatus 20 and an Internet-connected device 40. The Internet-connected device 40 communicates w with a license server located at, or associated with, the service provider 10 via the Internet 30 to subscribe to the DRM protected content or service according to one embodiment.

In one example, the service provider 10 is a broadcaster of television content and the reception apparatus 20 is a television. However, embodiments of the present disclosure may be utilized to provide access to other broadcast content (e.g., executable application such as games). The service provider 10 transmits a broadcast stream that includes one or more DRM protected content and may be delivered via a digital television broadcast signal. Each of the one or more DRM protected content includes at least one encrypted media component. The reception apparatus 20 obtains one or more licenses in order to access the one or more DRM protected content. For example, a license may provide access to an individual DRM protected content, a service that includes one or more DRM protected content, or all DRM protected content provided by a specific service provider 10.

The service provider (e.g., a broadcaster entity or broadcast station) 10, in one embodiment, is a service distribution system that includes a transmission apparatus with a transmitter that is configured to transmit one or more services in a data stream (e.g., a broadcast stream) to the reception apparatus 20. The transmitter is configured to provide the data stream to the reception apparatus 20, for example via a digital terrestrial broadcast. In other examples, the data stream may be transmitted to the reception apparatus 20 over one or a combination of the digital terrestrial broadcast, a mobile phone network, a broadband network such as the Internet, a cable network, and a satellite link. The service distribution system may use any one or a variety of transmission techniques to communicate the data stream to the reception apparatus 20.

The service distribution system according to one embodiment includes a source encoder, a channel encoder, and a modulator. The source encoder includes data, audio, and video encoders to compress the audio, video, signaling, control or other data received from a source. The channel encoder randomizes, interlaces, channel codes, and frame maps the compressed media and signaling data. For example, the channel encoder includes a frame builder that forms many data cells into sequences to be conveyed on Orthogonal frequency-division multiplexing (OFDM) symbols. The modulator (e.g., a multiplexer) converts the processed digital data into modulation symbols, which can be, for example OFDM symbols (e.g., in the case of the ATSC 3.0 standard currently undergoing standardization). The multiplexed data is then passed to an inverse fast Fourier transformer (IFFT) which transforms a frequency domain signal into a time domain signal. The time domain signal is fed to a guard insertion module for generating a guard interval (GI) between symbols and then to a digital-toanalog (D/A) converter. Then, up-conversion, RF amplification, and over-the air broadcasting are performed to transmit a broadcast stream.

Certain components of the transmission apparatus or the reception apparatus may not be necessary in other embodiments. Details of an OFDM transmitter and receiver may be found, for example, in the DVB-T2 standard (ETSI EN 302 755 V1.4.1 dated Jul. 1, 2015), ATSC Standard A/322—Physical Layer Protocol (Doc. A/322:2017 dated Jun. 6, 2017), and ATSC Standard A/321—System Discovery and Signaling (Doc. A/321:2016 dated Mar. 23, 2016) which are incorporated herein by reference in their entirety.

FIG. 2 illustrates an exemplary reception apparatus 20, which is configured to access one or more protected services. The reception apparatus 20 may be a fixed or mobile device such as a television set, a set top box, smartphone, tablet computer, laptop, portable computer, or any other device configured to receive television content. Further, the reception apparatus 20 may be a digital television receiver that is incorporated in a vehicle or any of the fixed or mobile devices described above.

The reception apparatus 20 includes receiver circuitry that is configured to receive a data stream (e.g., a broadcast stream) from one or more service providers 10 and processing circuitry that is configured to perform various functions of the reception apparatus 20. In one embodiment, a tuner/demodulator 202 receives broadcast emissions containing the broadcast stream. Depending on the embodiment, the reception apparatus 20 may alternatively or additionally be configured to receive a cable television transmission or a satellite broadcast. The tuner/demodulator 202 receives the data stream which may be demultiplexed by the demultiplexer 204 or handled by middleware and separated into audio and video (A/V) streams. The audio is decoded by an audio decoder 210 and the video is decoded by a video decoder 214. Further, uncompressed A/V data may be received via an uncompressed A/V interface (e.g., a HDMI interface), if available.

The reception apparatus 20 generally operates under control of at least one processor, such as the CPU 238, which is coupled to a working memory 240, program memory 242, and a graphics subsystem 244 via one or more buses (e.g., bus 250). The CPU 238 is configured to generate a user interface for a user to acquire license information to access the protected service according to one embodiment. The graphics outputted by the graphics subsystem 244 are combined with video images by the compositor and video interface 200 to produce an output suitable for display on a video display.

The CPU 238 operates to carry out functions of the reception apparatus 20 including processing related to presenting DRM protected content, and acquisition of the DRM license needed for the presentation. Further, the CPU 238 operates to execute script objects (control objects) contained in the application (e.g., HTML5 application). Broadcaster Applications (BA), etc., using for example an HTML5 user agent stored in the program memory 242.

In one embodiment, BA refers to the functionality embodied in a collection of files comprised of an HTML5 document, which is the initial HTML5 document referenced by application signaling that should be loaded first, and other HTML5, CSS, JavaScript, image, and multimedia resources referenced directly or indirectly by that document, all provided in the broadcast stream. The collection of files making up the BA can be delivered over broadcast as packages, via the ROUTE protocol described in ATSC Proposed Standard A/331 (Doc. S33-3331r1 dated Nov. 7, 2017) for example and incorporated by reference in its entirety. An exemplary BA is described in ATSC Proposed Standard A/344 (Doc. S34-230r5 dated Nov. 15, 2017), which is incorporated by reference in its entirety.

The CPU 238 may be coupled to any one or a combination of the reception apparatus 20 resources to centralize control of one or more functions, in certain embodiments. In one embodiment, the CPU 238 also operates to oversee control of the reception apparatus 20 including the tuner/demodulator 202 and other television resources.

Figure 3A:
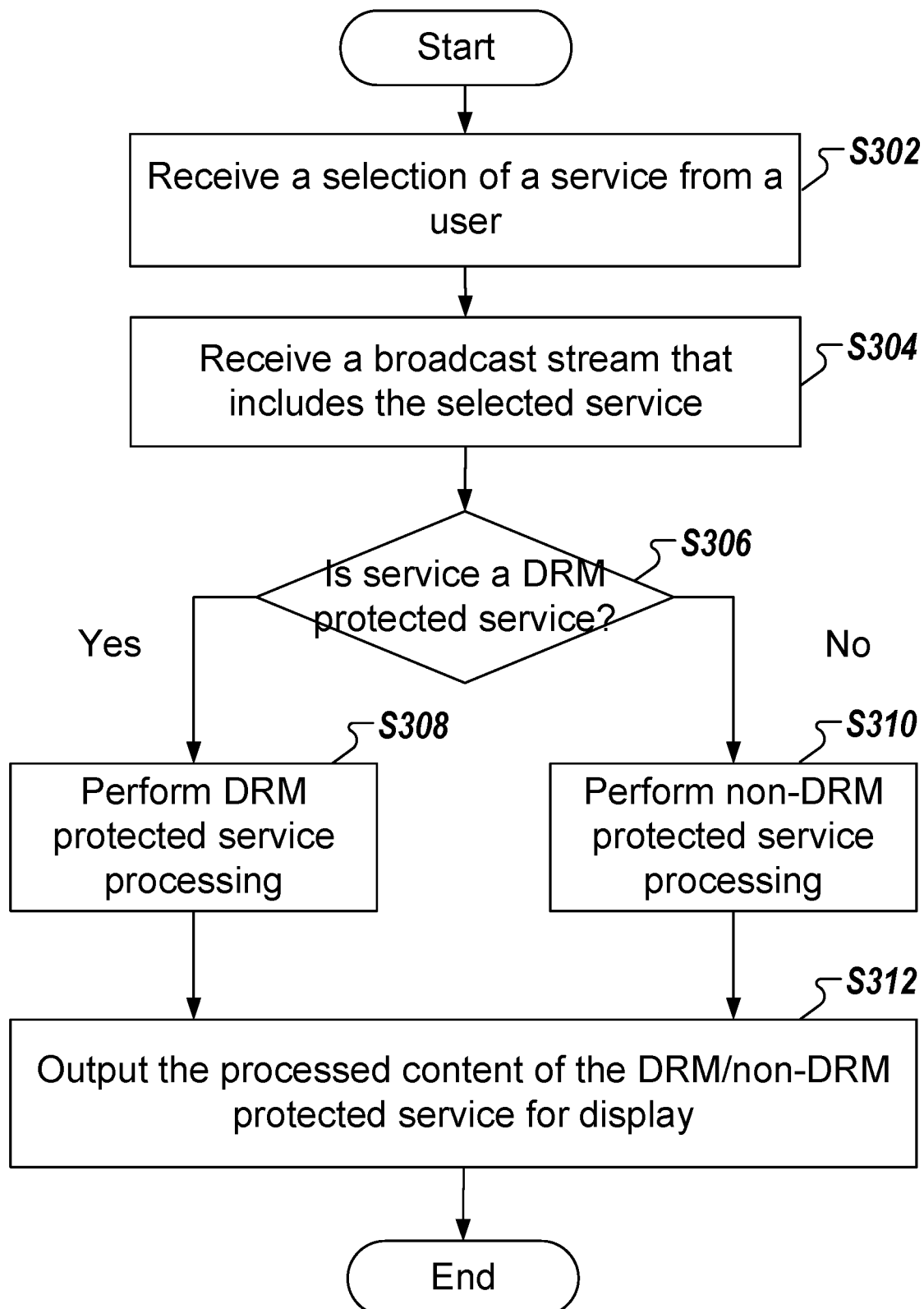
FIG. 3A illustrates an exemplary method for processing a service.

FIG. 3A illustrates an exemplary method of the reception apparatus 20 for presenting a service provided by the service provider 10. In step S302, processing circuitry of the reception apparatus 20 receives a request for selection of a service from a user. The service may be selected by a user selection of a channel (e.g., channel 4.1) associated with the service or the selection of the service by the user through interaction with an Electronic Service Guide (ESG).

The processing circuitry causes receiver circuitry of the reception apparatus 20 to tune to a broadcast channel on which a broadcast stream that includes the selected service is transmitted. In step S304, the receiver circuitry receives the broadcast stream provided by the service provider 10 on the tuned broadcast channel. The broadcast stream is broadcast over a radio frequency (RF) channel (e.g., a terrestrial broadcast channel) according to one embodiment.

In step S306, the processing circuitry determines whether the selected service is a DRM protected service. The selected service is processed according to step S308 or S310 based on whether the selected service is determined to be a DRM protected service. The content of the processed service is output for display in step S312.

Figure 3B:
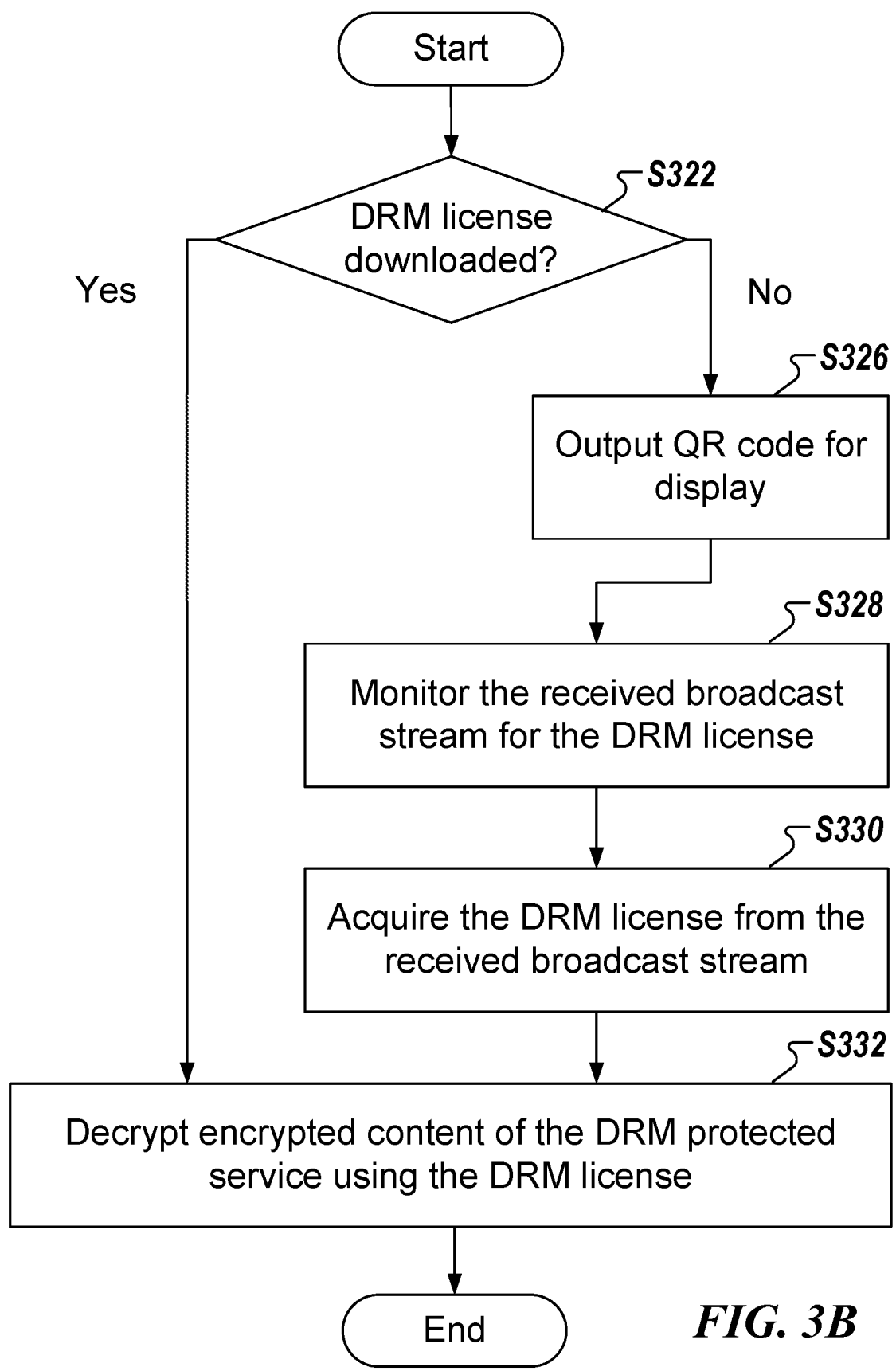
FIG. 3B illustrates an exemplary method for processing a DRM protected service.

FIG. 3B illustrates an exemplary method for performing the DRM protected service, processing of step S308. In step S322, the processing circuitry of the reception apparatus 20 determines whether a DRM license for the DRM protected service was previously downloaded or otherwise cached. If the processing circuitry determines that the DRM license was previously downloaded in step S322, the processing circuitry proceeds to step S332 at which time encrypted content of the DRM protected service is decrypted using the DRM license. For example, the processing circuitry uses a decryption key provided in, or derived from, the DRM license to decrypt the encrypted content.

If the processing circuitry determines that the DRM license has not been downloaded, or otherwise cached, in step S322, the processing circuitry outputs a QR code for display to the user. In one embodiment, a BA provided by the service provider 10 of the selected service is configured to generate and/or output the QR code for the display to the user. The BA is downloaded from the broadcast stream and is configured to assist the user in obtaining access to the DRM protected service, or specific content in the DRM protected service in certain embodiments.

One or more BAs may be provided for each service provider 10 to assist the user in accessing any DRM protected content or services provided by the respective service provider 10. A general BA, or service specific BA may be downloaded and/or executed for example when a user selects channel 4.7. When a single BA is provided for a plurality of protected services, the BA can be configured to detect the selected DRM protected content or service, or present a user interface for the user to select the DRM protected content or service, the user wishes to access and generate and/or output an appropriate QR code. The BA may determine which DRM system is supported by the reception apparatus 20 to generate and/or output an appropriate QR code. In one embodiment, the BA is configured to provide a user with different subscription options for a selected service. For example, the user may be prompted to select a subscription duration, the types of enhancements that are desired, etc.

Figure 4A:
FIGS. 4A, 4B illustrate exemplary user interfaces for subscribing to a DRM protected service.
Figure 4B:

The reception apparatus 20 displays a user interface including a QR code, as illustrated in FIG. 4A or 4B, in certain embodiments. In the example, the QR code encodes the following URL: https://wxbc.com/drm?ua=0124a67709&sid=5772. The URL includes the server address (wxbc.com), a directory on that server (/drm), and two parameters, the device ID ("ua=0124a67709") and a service identifier ("sid=5772"). Other parameters may be provided to specify subscription duration, payment information, DRM system type, enhancement types, and/or a specific content.

In one embodiment, the reception apparatus 20 changes the size of the displayed QR code in response to a user input or automatically (e.g., a certain time intervals). For example, the size of the displayed QR code may be changed by providing an instruction to the BA. Changing the size of the displayed QR code may be necessary, for example, if the QR code is too large or too small to be easily scanned by the Internet-connected device 40. In one embodiment, the BA is configured to display the QR code and message in a portion of the display while other content (e.g., a preview or base layer of the protected services) is presented to a user.

The device ID parameter is a number that is a globally unique identifier of the reception apparatus 20. It can function similarly to the way a MAC Address operates in Internet Protocols. A device ID can be represented by a large digital number, for example a number represented by 32 or more binary bits, and can include textual portions as well. The device ID used in the signaling can be created by a hash function using certain data items in the receiver as input. The algorithm used by a given device to create a device ID used with a particular DRM system is typically DRM system-dependent (e.g., defined by rules given the DRM system provider to the reception apparatus manufacturer).

The service identifier parameter is a number that is used to identify the protected service that the user wishes to access. The service identifier is utilized, for example, when the service provider 10 offers different types of access for different services.

By scanning the QR code displayed on a screen of the reception apparatus 20 using an application (e.g., a browser with a QR code scanner) on the Internet-connected device 40, as illustrated in FIG. 5 for example, the user w could be taken directly to the website of the service provider 10, and the web server would be automatically provided with the user's device ID and, in certain embodiments the identification of the service of interest to this viewer. The subscription process could proceed from there, for example as illustrated in FIGS. 6A. 6B. The subscription process may require a user to fill out a questionnaire, agree to share history information (e.g., viewing and/or browsing information) and/or demographic information (e.g., gender, age, marital status), or submit payment to a provider of the high-value service and/or media.

In step S328, the processing circuitry of the reception apparatus 20 monitors the received broadcast stream for a DRM license needed to access the selected DRM protected service, or specific content in the DRM protected service in certain embodiments. In one embodiment, the processing circuitry monitors the broadcast stream while the QR code is displayed to the user and until a DRM license associated with a unique identifier of the reception apparatus 20 is detected in the broadcast stream or the monitoring is canceled (e.g., when user otherwise tunes away from the selected DRM protected service).

In step S330, the processing circuitry of the reception apparatus 20 acquires the DRM license from the received broadcast stream. For example, the processing circuitry acquires a DRM license that is associated with the unique identifier of the reception apparatus 20. The processing circuitry decrypts the one or more encrypted components of the selected service using the DRM license in step S332. For example, the processing circuitry decrypts the one or more encrypted components using a decryption key that is extracted, or otherwise derived, from the acquired DRM license.

Figure 6B:
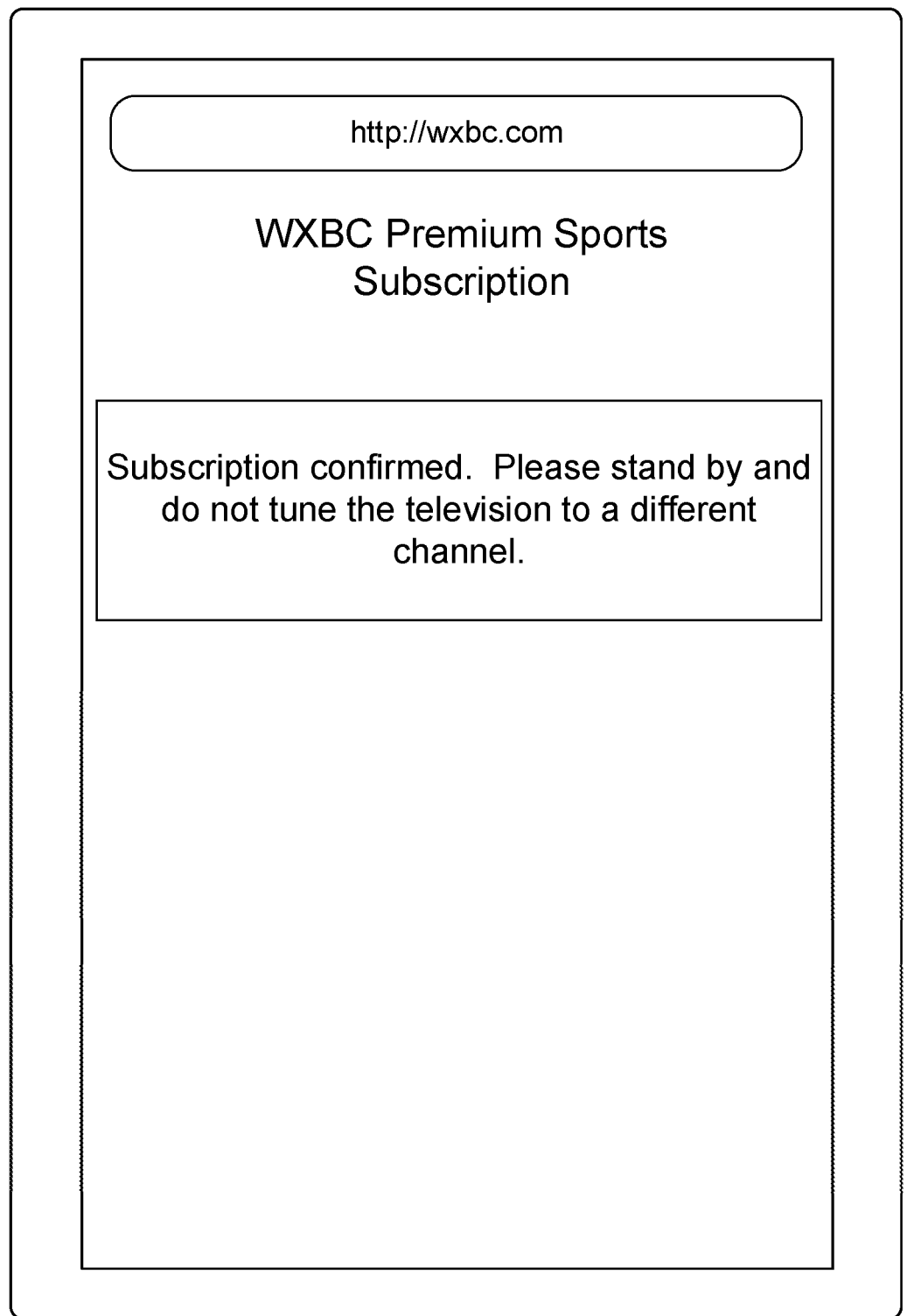

FIGS. 6A, 6B illustrate exemplary web pages that are accessed by the Internet-connected device 40 to obtain access to a protected service according to one embodiment. The reception apparatus 20 may directly access these webpages when the reception apparatus 20 is determined to be connected to the Internet, in certain embodiments.

As described above, a user scans a QR code displayed by the reception apparatus 20 with the Internet-connected device 40 to obtain access to the DRM protected service according to one embodiment. The QR code may be scanned with a built-in camera on the Internet-connected device 40. The scanning of the QR code causes the Internet-connected device 40 to take the user to a website for the DRM protected service. For example, the scanning of the QR code causes a browser installed on the Internet-connected device 40 to load the webpage illustrated in FIG. 6A.

Once the user enters the required information illustrated in FIG. 6A and selects the submit button, a confirmation webpage illustrated in FIG. 6B for example is displayed in one embodiment. The confirmation webpage notifies the user that access to the protected service has been approved, and further instructs the user not to tune away from the current television channel to allow the license for the selected protected service to be downloaded.

The BA running on the reception apparatus 20 may be configured to generate a user interface for the user to enter subscription information, for example as illustrated in FIG. 6A, in one embodiment. The BA could then generate a QR code that further includes the entered information. For example, the generated QR code could include the URL described above and include additional parameters for one or a combination of the first name, last name, e-mail, and payment information entered into the user interface of the BA. The additional parameters may be previously registered in the reception apparatus 20, in one embodiment, to facilitate into the user interface of the BA. In this case, the BA can automatically retrieve the additional parameters that have been preregistered in the reception apparatus 20.

Figure 7:
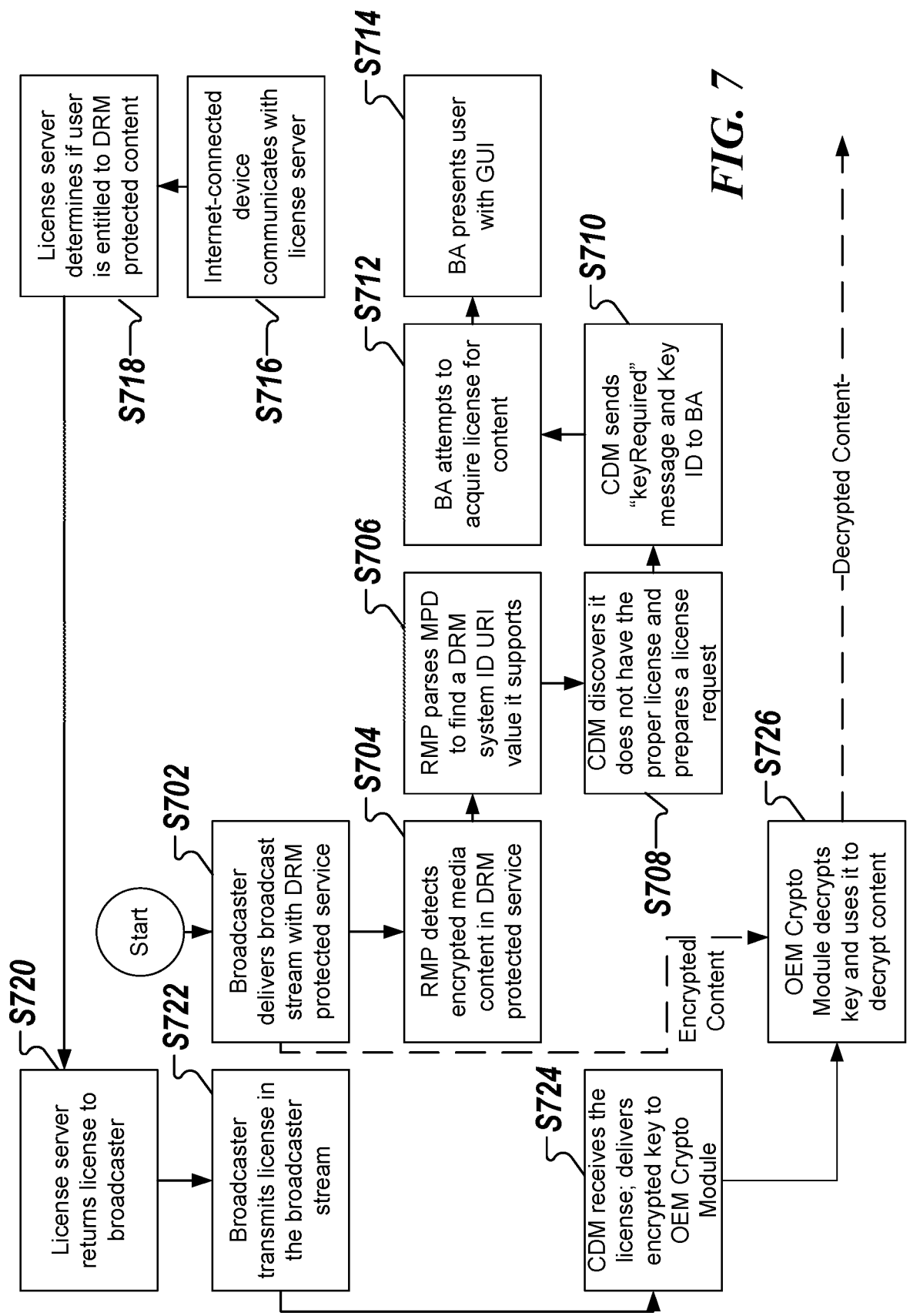
FIG. 7 illustrates an exemplary how operation for accessing a DRM protected service in the digital television broadcast system.

FIG. 7 illustrates a flow operation for an exemplary use case for a reception apparatus 20 that is not connected to the Internet. In this example, a user of the reception apparatus 20 encounters a DRM protected service (e.g., an ATSC 3.0 service), in which one of the components (e.g., an enhancement layer for the video) is encrypted. The reception apparatus 20 can make use of the enhancement layer to convert high definition resolution to ultra-high definition resolution.

The flow operation starts at step S702, at which time the reception apparatus 20 encounters the DRM protected service with the encrypted component. The encrypted content is provided to the OEM Crypto Module as indicated by the dotted line. In step S704, a receiver media player (RMP) installed on the reception apparatus 20 identifies that the HEVC Scalability Extension (SHVC) video component is encrypted. In one embodiment, the reception apparatus 20 includes two software components, an application media player (AMP) and the RMP that can play out media content delivered via either broadcast or broadband. The AMP is JavaScript code (e.g., DASH.js), which is part of an HTML5 BA, while the RMP is a receiver-specific implementation. The RMP can be triggered to play out media content streamed over broadcast by receiver logic or an explicit request from a BA. An example of the BA is described in ATSC Proposed Standard A/344.

In step S706, the RMP processes the service signaling (e.g., the DASH Media Presentation Description) and discovers which DRM Systems may be used to decrypt the encrypted component. The reception apparatus 20 provides the information about this encrypted component to a content decryption module (CDM) associated with the DRM System to be used.

In step S708, the CDM discovers that it does not have the proper DRM license needed to decrypt this component. The CDM then initiates communication with a BA, and conveys a "keyRequired" message, with the identification of the necessary key ("KeyID") in step S710. The BA is downloaded from the broadcast stream according to one embodiment, for example when the BA is detected in the broadcast stream or when a determination is made that the proper DRM license has not been downloaded or cached. The BA may be executed when the CDM determines that a key is required.

In step S712, the BA determines that Internet connectivity is not available and that the DRM license cannot be obtained via the Internet. In step S714, the BA prepares a user interface such as one of the interfaces illustrated in FIGS. 4A, 4B to help guide the user to gain access to the DRM protected service. In step S716, the user scans the QR code displayed in the user interface using the Internet-connected device 40 to access a webpage or application to subscribe to the protected service. If the requirements for accessing the DRM protected service are met (e.g., payment, subscription, answering a questionnaire, etc.) in step S718, then the license server in step S720 interacts with the broadcaster to deliver a DRM license for distribution within the broadcast signal.

In step S722, the broadcaster includes the DRM license for the reception apparatus 20 in the broadcast signal. The DRM license may be provided to the reception apparatus 20 as described in U.S. application Ser. No. 15/680,068, which is incorporated by reference in its entirety.

In step S724, the reception apparatus 20 captures the DRM license and feeds it to the CDM identified by the signaled DRM System ID. The CDM uses the DRM license to derive the encrypted key for the content and feeds it to the OEM Crypto Module. In step S726, the OEM Crypto Module decrypts the content key and uses it to descramble the encrypted component and outputs decrypted content, as indicated by the dotted line.

The following provides a more detailed description of the experience a user of the reception apparatus 20 might encounter when using the QR code system described above. First, the user peruses the ESG and notices a program of interest on a programming service called "Premium Sports." The user then selects that service. The reception apparatus 20 acquires the selected service and discovers (1) access to audio/video content is blocked because the service is protected by a DRM system (e.g., the content is encrypted); and (2) there is a BA associated with the "Premium Sports" service available to be downloaded and executed. The BA is broadcaster specific in certain embodiments to allow the broadcaster to have control over the user experience for subscribing to the DRM protected service. For example, the broadcaster can customize the look of the user interface including the QR code.

The reception apparatus 20 downloads and launches the BA. The reception apparatus 20 notifies the BA that a key is needed. The notification includes some information derived from the broadcast signaling, including a telephone number to call, the URL of a web server the user could use to register using a web browser, and the device ID the user would need when registering by phone. The BA creates a QR code using the provided web server URL, adding as query terms the user's device ID and a representation of the ID of the "Premium Sports" service.

The BA puts up a full-screen display for the user, including three ways he might proceed to get access to "Premium Sports";

(1) By using the given telephone number, and giving the operator the device ID shown on screen;

(2) By typing the given URL into the Internet-connected device 40 (e.g., a smart phone or tablet), entering the given device ID into an on-screen form, and fulfilling any requirements (payment, etc.) required by the subscription process;

(3) By using the Internet-connected device 40 and scanning the on-screen QR code, then interacting with the website that comes up as a result (fulfilling requirements as above).

The user chooses the QR code option. At the completion of the registration, the user is told to stand by and not tune his TV away. Momentarily (e.g., within a few minutes), the reception apparatus 20 recovers the necessary DRM license to allow it to decrypt the keys necessary to descramble the content on the "Premium Sports" service.

Although certain embodiments of the present disclosure have been described as utilizing a QR code to facilitate access to the license server of the service provider 10, the information contained in the QR code may be communicated by establishing a wireless connection between the reception apparatus 20 to the Internet-connected device 40 in other embodiments. The wireless connection may be established using one or a combination of Bluetooth, and NFC.

In each of these cases, a minimal amount of information coming from the reception apparatus 20 to the user's internet, connected device 40 is enough to enable the user interaction needed to grant access to the service, for example, by providing the same information contained in the QR code as described above. However, these methods may require a pre-installed application to be running in the Internet-connected device 40, which would be launched as appropriate (e.g., by user selection or NFC). The pre-installed application may be an application provided by the TV manufacturer that includes a remote control and a program guide, in addition to an interface to facilitate subscribing to the, protected content. For example, in the same way that the "Android Pay" application is launched on an Internet-connected Android device (phone or tablet) when that application is loaded and the device is placed close to a pay point, a "Watch Pay TV" application could be launched when that application has been loaded into the Internet-connected device 40 and is placed close to the reception apparatus 20.

If both the reception apparatus 20 and Internet-connected device 40 are Wi-Fi enabled, they can discover each other and establish a communication path, even if a home network is not connected to an Internet gateway or even if a DHCP server is not present on the network. Each device can assign itself an IP address usable for local networking us ng protocol such as Apple Bonjour. If Bonjour is used, each device assigns itself a link-local IP address. Link-local addresses for IPv4 are defined in the address block 169.254.0.0/16. Bonjour includes a discovery protocol as well, so for the present case, the Internet-connected device 40 could discover the reception apparatus 20 and initiate communications. Using this communication path, an application running the Internet-connected device 40 can use a mobile data service to communicate with the license server.

The user may need to manually launch a particular application to utilize the Wi-Fi connection. For example, a smartphone could run an application that would attempt to discover a reception apparatus 20 that does not have Internet access. The Wi-Fi connection would allow the application on the smartphone to communicate with the reception apparatus 20 and receive the information contained in the QR code for example.

As described above, the reception apparatus 20 may communicate with an application running on the Internet-connected device 40 using a Bluetooth connection. The user first downloads and installs the application. The application, upon receiving a connection request from the reception apparatus 20, launches. The launched application interacts with the reception apparatus 20 to communicate information contained in the QR code to the Internet-connected device 40.

Use of NFC may be similar to the Bluetooth case, except that "mating" of the reception apparatus 20 and the Internet-connected device 40 would be initiated by the user bringing the Internet-connected device physically close to some area on the reception apparatus 20. This action launches a pre-installed application in the Internet-connected device 40 in a similar way that the Android Pay application, for example, is launched if the user brings an NFC-enabled phone dose to a pay terminal that supports Android Pay. For example, the near-field communication wakes up a manufacturer-specific application installed on the Internet-connected device 40 that includes one or a combination of a remote control and a program guide, in addition to an interface to facilitate subscribing to the protected content.

Figure 8:
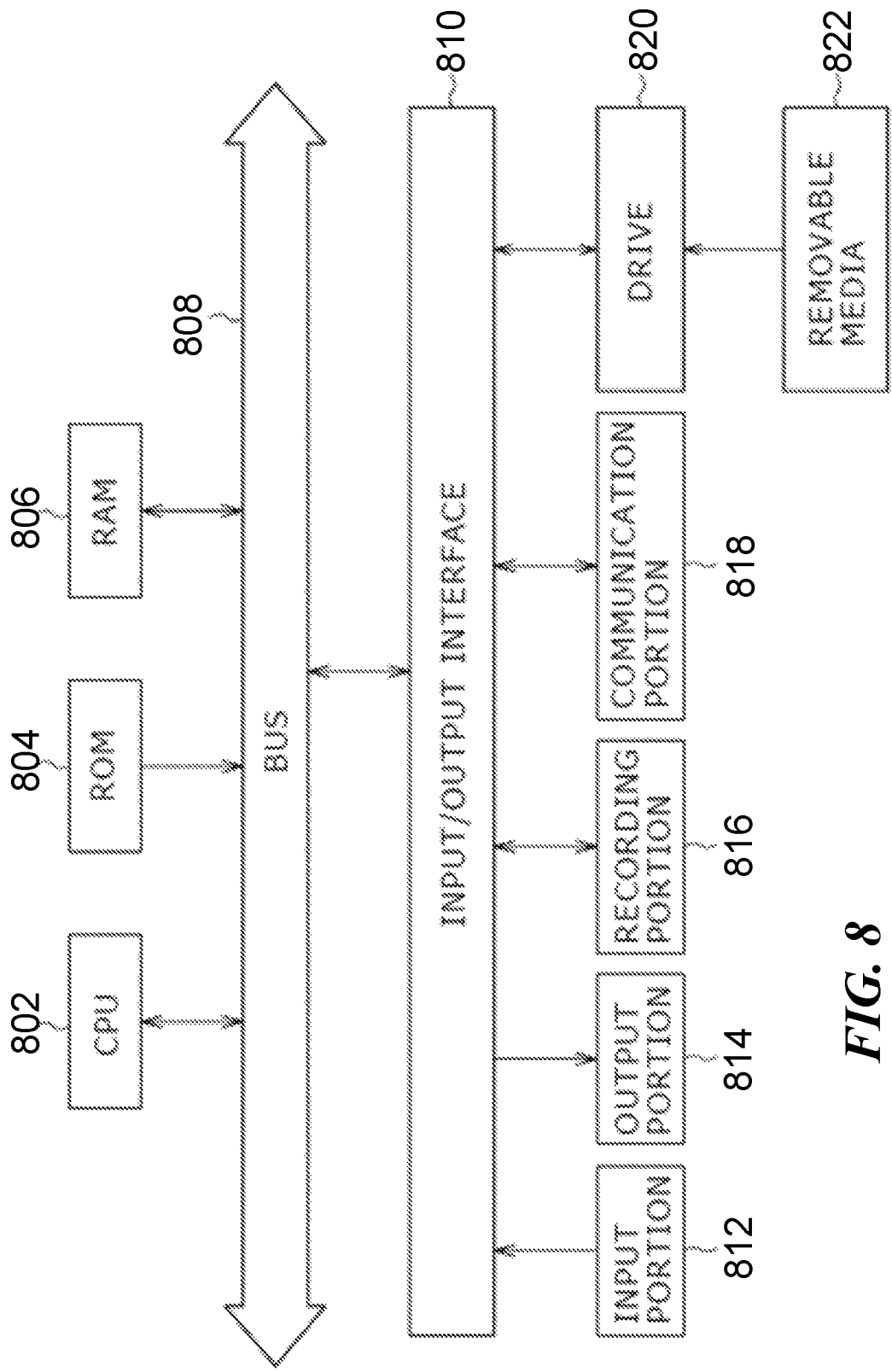
FIG. 8 illustrates an example of a hardware configuration of a computer.

FIG. 8 is a block diagram showing an example of a hardware configuration of a computer that can be configured to perform functions of any one or a combination of reception apparatus and service distribution system. For example, in one embodiment, the computer is configured to perform one or a combination of the functions described herein with respect the reception apparatus 20, the Internet-connected device 40, and/or the service distribution apparatus.

As illustrated in FIG. 8 the computer includes a CPU 802, ROM (rend only memory) 804, and a RAM (random access memory) 806 interconnected to each other via one or more buses 808. The one or more buses 808 are further connected with an input-output interface 810. The input-output interface 810 is connected with an input portion 812 formed by a keyboard, a mouse, a microphone, remote controller, etc. The input-output interface 810 is also connected an output portion 814 formed by an audio interface, video interface, display, speaker and the like; a recording portion 816 formed by a hard disk, a non-volatile memory or other non-transitory computer readable storage medium; a communication portion 818 formed by a network interface, modem, USB interface, fire wire interface, etc.; and a drive 820 for driving removable media 822 such as a magnetic disk, an optical disk, a magneto-optical disk, a semiconductor memory, etc.

According to one embodiment, the CPU 802 loads a program stored in the recording portion 816 into the RAM 806 via the input-output interface 810 and the bus 808, and then executes a program configured to provide the functionality of the one or a combination of the functions described herein with respect to the reception apparatus 20, the Internet-connected device 40, and/or the service distribution apparatus.

The hardware description, above, exemplified by any one of the structure examples shown in FIGS. 2 and 8, constitutes or includes specialized corresponding structure that is programmed or configured to perform the algorithm describe above, for example with reference to FIGS. 3A, 3B, and 7. For example, any one or a combination of the algorithms shown in FIGS. 3A, 3B, and 7 may be completely performed by the circuitry included in the single device shown in FIG 2.

A system that includes the features in the foregoing description provides numerous advantages. In particular, the methodologies described herein may be employed to allow a reception apparatus that is not connected to the Internet to access protected services and/or content.

Obviously, numerous modifications and variations are possible in light of the above teachings. It is therefore to be understood that within the scope of the appended claims, the present disclosure may be practiced otherwise than as specifically described herein.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the present disclosure is intended to be illustrative, but not limiting of the scope of the present disclosure, as well as other claims. The disclosure, including, any readily discernible variants of the teachings herein, defines, in part, the scope of the foregoing claim terminology such that no inventive subject matter is dedicated to the public.

The above disclosure also encompasses the embodiments listed below.

(1) A reception apparatus, including receiver circuitry configured to receive a broadcast stream that includes a television service selected by a user; and processing circuitry-configured to receive a user selection of the television service included in the broadcast stream; and determine whether the selected television service is a digital rights management (DRM) protected service; when the selected television service is determined to be the DRM protected service, output a quick response (QR) code for display, the QR code containing a uniform resource locator (URL) that includes an address of a website for subscribing to the selected television service and a unique identifier of the reception apparatus, monitor the received broadcast stream for a DRM license that is associated with the unique identifier of the reception apparatus, acquire the DRM license that is associated with the unique identifier of the reception apparatus from the received broadcast stream, and decrypt at least one media component of the selected television service using the acquired DRM license.

(2) The reception apparatus according to feature (1), in which the URL further includes a service identifier of the selected television service.

(3) The reception apparatus according to feature (1) or (2), in which the processing circuitry is configured to download a broadcaster application included in the broadcast stream, and execute the broadcaster application when the selected television service is determined to be the DRM protected service; and the broadcaster application is configured to generate the QR code for display.

(4) The reception apparatus according to any of features (1) to (3), in which the processing circuitry is configured to, when the selected television service is determined to be the DRM protected service, determine whether the reception apparatus is connected to the Internet, and output the QR code for display when the reception apparatus is determined not to be connected to the Internet.

(5) The reception apparatus according to any of features (1) to (4), in which the selected television service is a linear audio/video service.

(6) The reception apparatus according to any of features (1) to (5), in which the DRM license is included in the broadcast stream after the user subscribes to the selected television service via the website, the website being accessed when the QR code is scanned by an Internet-connected device.

(7) A non-transitory computer-readable medium storing instructions which when executed by a computer cause the computer to perform a method of accessing a digital rights management (DRM) protected service, the method including receiving a user selection of a television service included in the broadcast stream; receiving a broadcast stream that includes the television service selected by a user; determining whether the selected television service is the DRM protected service; and when the selected television service is determined to be the DRM protected service, outputting a quick response (QR) code for display, the QR code containing a uniform resource locator (URL) that includes an address of a website for subscribing to the selected television service and a unique identifier of the reception apparatus, monitoring the received broadcast stream for a DRM license that is associated with the unique identifier of the reception apparatus, acquiring the DRM license that is associated with the unique identifier of the reception apparatus from the received broadcast stream, and decrypting at least one media component of the selected television service using the acquired DRM license.

(8) The non-transitory computer-readable medium according to feature (7), in which the URL further includes a service identifier of the selected television service.

(9) The non-transitory computer-readable medium according to feature (7) or (8), in which the method further includes downloading a broadcaster application included in the broadcast stream, and executing the broadcaster application when the selected television service is determined to be the DRM protected service, in which the broadcaster application is configured to generate the QR code for display.

(10) The non-transitory computer-readable medium according to any of features (7) to (9), further including when the selected television service is determined to be the DRM protected service, determining whether the reception apparatus is connected to the Internet, and outputting the QR code for display when the reception apparatus is determined not to be connected to the Internet.

(11) The non-transitory computer-readable medium according to any of features (7) to (10), in which the selected television service is a linear audio/video service.

(12) The non-transitory computer-readable medium according to any of features (7) to (11), in which the DRM license is included in the broadcast stream after the user subscribes to the selected television service via the website, the website being accessed when the QR code is scanned by an Internet-connected device.

(13) A method of a reception apparatus for accessing a digital rights management (DRM) protected service, the method includes receiving a user selection of a television service included in the broadcast stream; receiving, by receiver circuitry of the reception apparatus, a broadcast stream that includes the television service selected by a user; determining whether the selected television service is the DRM protected service; and when the selected television service is determined to be the DRM protected service, outputting, by processing circuitry of the reception apparatus, a quick response (QR) code for display, the QR code containing a uniform resource locator (URL) that includes an address of a website for subscribing to the selected television service and a unique identifier of the reception apparatus, monitoring, by the processing circuitry, the received broadcast stream for a DRM license that is associated with the unique identifier of the reception apparatus, acquiring, by the processing circuitry, the DRM license that is associated with the unique identifier of the reception apparatus from the received broadcast stream, and decrypting at least one media component of the selected television service using the acquired DRM license.

(14) The method according to feature (13), in which the URL further includes a service identifier of the selected television service.

(15) The method according to feature (13) or (14), further including downloading a broadcaster application included in the broadcast stream, and executing the broadcaster application when the selected television service is determined to be the DRM protected service, in which the broadcaster application is configured to generate the QR code for display.

(16) The method according to any of features (13) to (15), further including when the selected television service is determined to be the DRM protected service, determining whether the reception apparatus is connected to the Internet, and outputting the QR code for display when the reception apparatus is determined not to be connected to the Internet.

(17) The method according to any of features (13) to (16), in which the selected television service is a linear audio/video service.

(18) The method according to any of features (13) to (17), in which the DRM license is included in the broadcast stream after the user subscribes to the selected television service via the w website, the website being accessed when the QR code is scanned by an Internet-connected device.

The invention claimed is:

1. A reception apparatus, comprising:
receiver circuitry configured to receive a broadcast stream that includes a television service selected by a user and signaling information corresponding to the television service; and
processing circuitry configured to:
receive a user selection of the television service included in the broadcast stream;
determine whether the selected television service is a digital rights management (DRM) protected service; and
when the selected television service is determined to be the DRM protected service,
determine a DRM system used to process the selected television service based on information for identifying the DRM system, the information for identifying the DRM system being included in the signaling information,
create a unique identifier of the reception apparatus by applying a function defined according to the determined DRM system,
output a quick response (QR) code for display, the QR code containing a uniform resource locator (URL) that includes an address of a website for subscribing to the selected television service and the unique identifier of the reception apparatus, monitor the received broadcast stream for a DRM license, corresponding to the DRM system, that is associated with the unique identifier of the reception apparatus, acquire the DRM license that is associated with the unique identifier of the reception apparatus from the received broadcast stream, and decrypt at least one media component of the selected television service using the acquired DRM license.

2. The reception apparatus according to claim 1, wherein the URL includes a service identifier of the selected television service.

3. The reception apparatus according to claim 1, wherein the processing circuitry is further configured to:

download a broadcaster application included in the broadcast stream, and execute the broadcaster application when the selected television service is determined to be the DRM protected service, the broadcaster application being configured to generate the QR code for display.

4. The reception apparatus according to claim 1, wherein the processing circuitry is further configured to, when the selected television service is determined to be the DRM protected service:

determine whether the reception apparatus is connected to the Internet, and output the QR code for display when the reception apparatus is determined not to be connected to the Internet.

5. The reception apparatus according to claim 1, wherein the selected television service is a linear audio/video service.

6. The reception apparatus according to claim 1, wherein the DRM license is included in the broadcast stream after the user subscribes to the selected television service via the website, the website being accessed when the QR code is scanned by an Internet-connected device.

7. A system comprising:

a reception apparatus comprising:

receiver circuitry configured to receive a broadcast stream that includes a television service selected by a user and signaling information corresponding to the television service; and first processing circuitry configured to:

receive a user selection of the television service included in the broadcast stream, determine whether the selected television service is a digital rights management (DRM) protected service, and when the selected television service is determined to be the DRM protected service, determine a DRM system used to process the selected television service based on information for identifying the DRM system, the information for identifying the DRM system being included in the signaling information, create a unique identifier of the reception apparatus by applying a function defined according to the determined DRM system, output a quick response (QR) code for display, the QR code containing a uniform resource locator (URL) that includes an address of a website for subscribing to the selected television service and the unique identifier of the reception apparatus, monitor the received broadcast stream for a DRM license, corresponding to the DRM system, that is associated with the unique identifier of the reception apparatus, acquire the DRM license that is associated with the unique identifier of the reception apparatus from the received broadcast stream, and decrypt at least one media component of the selected television service using the acquired DRM license; and an Internet-connected device comprising:

a camera configured to scan the QR code output by the reception apparatus; and second processing circuitry configured to:

access the website for subscribing to the selected television service, and control subscribing to the selected television service.

8. The system according to claim 7, wherein the URL includes a service identifier of the selected television service.

9. The system according to claim 7, wherein the first processing circuitry is further configured to:

download a broadcaster application included in the broadcast stream, and execute the broadcaster application when the selected television service is determined to be the DRM protected service, the broadcaster application being configured to generate the QR code for display.

10. The system according to claim 7, wherein the first processing circuitry is configured to, when the selected television service is determined to be the DRM protected service:

determine whether the reception apparatus is connected to the Internet, and output the QR code for display when the reception apparatus is determined not to be connected to the Internet.

11. The system according to claim 7, wherein the selected television service is a linear audio/video service.

12. The system according to claim 7, wherein the DRM license is included in the broadcast stream after the user subscribes to the selected television service via the website.

13. A method of a reception apparatus for accessing a digital rights management (DRM) protected service, the method comprising:

receiving, by receiver circuitry of the reception apparatus, a broadcast stream that includes a television service selected by a user and signaling information corresponding to the television service;

receiving a user selection of the television service included in the broadcast stream;

determining whether the selected television service is the DRM protected service; and when the selected television service is determined to be the DRM protected service, determining a DRM system used to process the selected television service based on information for identifying the DRM system, the information for identifying the DRM system being included in the signaling information, creating a unique identifier of the reception apparatus by applying a function defined according to the determined DRM system, outputting, by processing circuitry of the reception apparatus, a quick response (QR) code for display, the QR code containing a uniform resource locator (URL) that includes an address of a website for subscribing to the selected television service and the unique identifier of the reception apparatus, monitoring, by the processing circuitry, the received broadcast stream for a DRM license, corresponding to the DRM system, that is associated with the unique identifier of the reception apparatus, acquiring, by the processing circuitry, the DRM license that is associated with the unique identifier of the reception apparatus from the received broadcast stream, and decrypting at least one media component of the selected television service using the acquired DRM license.

14. The method according to claim 13, wherein the URL includes a service identifier of the selected television service.

15. The method according to claim 13, the method comprising:

downloading a broadcaster application included in the broadcast stream; and executing the broadcaster application when the selected television service is determined to be the DRM protected service, the broadcaster application being configured to generate the QR code for display.

16. The method according to claim 13, the method comprising:

when the selected television service is determined to be the DRM protected service, determining whether the reception apparatus is connected to the Internet, and outputting the QR code for display when the reception apparatus is determined not to be connected to the Internet.

17. The method according to claim 13, wherein the DRM license is included in the broadcast stream after the user subscribes to the selected television service via the website, the website being accessed when the QR code is scanned by an Internet-connected device.

18. The method according to claim 13, wherein the at least one media component of the selected television service comprises an enhancement layer for a video of the selected television service, the enhancement layer being used to convert resolution of the video into higher definition resolution.

19. The reception apparatus according to claim 1, wherein the at least one media component of the selected television service comprises an enhancement layer for a video of the selected television service, the enhancement layer being used to convert resolution of the video into higher definition resolution.

20. The system according to claim 7, wherein the at least one media component of the selected television service comprises an enhancement layer for a video of the selected television service, the enhancement layer being used to convert resolution of the video into higher definition resolution.

* * * * *